US010069919B2

United States Patent
Yu et al.

(10) Patent No.: US 10,069,919 B2
(45) Date of Patent: Sep. 4, 2018

(54) METHOD FOR EXCHANGING INFORMATION BETWEEN IN-VEHICLE TERMINALS AND IN-VEHICLE TERMINAL

(71) Applicant: Huawei Technologies Co., Ltd., Shenzhen (CN)

(72) Inventors: Xiaobo Yu, Beijing (CN); Shuiping Long, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/517,777

(22) PCT Filed: Oct. 8, 2014

(86) PCT No.: PCT/CN2014/088128
§ 371 (c)(1),
(2) Date: Apr. 7, 2017

(87) PCT Pub. No.: WO2016/054767
PCT Pub. Date: Apr. 14, 2016

(65) Prior Publication Data
US 2017/0302740 A1  Oct. 19, 2017

(51) Int. Cl.
*H04B 1/3822* (2015.01)
*H04L 29/08* (2006.01)
(Continued)

(52) U.S. Cl.
CPC ............ *H04L 67/12* (2013.01); *B60R 16/023* (2013.01); *H04B 1/3822* (2013.01);
(Continued)

(58) Field of Classification Search
CPC ........... H04M 3/42; H04L 67/12; G08G 1/163
(Continued)

(56) References Cited

U.S. PATENT DOCUMENTS 7,382,274 B1* 6/2008 Kermani ............ B60K 31/0058
340/435
7,748,021 B2* 6/2010 Obradovich ..... G08G 1/096716
348/149
(Continued)

FOREIGN PATENT DOCUMENTS

CN       1787528 A       6/2006
CN     102638768 A       8/2012
(Continued)

OTHER PUBLICATIONS

Machine Translation and Abstract of Chinese Publication No. CN1787528, Jun. 14, 2006, 10 pages.
(Continued)

*Primary Examiner* — Tan Q Nguyen
(74) *Attorney, Agent, or Firm* — Conley Rose, P.C.

(57) ABSTRACT

A method for exchanging information between in-vehicle terminals, and an in-vehicle terminal is provided. The method includes a first in-vehicle terminal that triggers, by sending a broadcast message, at least one surrounding second in-vehicle terminal to establish a first relationship with the first in-vehicle terminal, and establishes a second relationship with at least one third in-vehicle terminal. The first in-vehicle terminal separately exchanges information about a correspondence type with the at least one second or third in-vehicle terminal so that more vehicles can intelligently exchange in-vehicle information, and exchange different information with different in-vehicle terminals. This can properly protect privacy information.

16 Claims, 6 Drawing Sheets

(51) Int. Cl.
*B60R 16/023* (2006.01)
*H04L 29/06* (2006.01)
*H04W 4/04* (2009.01)
*H04W 72/04* (2009.01)
*H04M 3/42* (2006.01)
*H04W 4/00* (2018.01)
*H04W 36/08* (2009.01)
*H04W 52/14* (2009.01)
*H04W 52/22* (2009.01)
*H04W 52/24* (2009.01)
*H04W 52/34* (2009.01)
*H04W 4/80* (2018.01)

(52) U.S. Cl.
CPC ............ *H04L 63/107* (2013.01); *H04L 67/32* (2013.01); *H04W 4/046* (2013.01); *H04W 72/0406* (2013.01); *H04W 4/008* (2013.01); *H04W 4/80* (2018.02); *H04W 36/08* (2013.01); *H04W 52/143* (2013.01); *H04W 52/225* (2013.01); *H04W 52/241* (2013.01); *H04W 52/346* (2013.01)

(58) Field of Classification Search
USPC .......................................................... 701/36
See application file for complete search history.

(56) References Cited

U.S. PATENT DOCUMENTS

| | | | |
|---|---|---|---|
| 8,369,867 B2* | 2/2013 | Van Os ................... | H04W 4/02 370/310.2 |
| 8,514,825 B1* | 8/2013 | Addepalli ............. | H04W 4/046 370/338 |
| 2004/0116106 A1 | 6/2004 | Shishido et al. | |
| 2004/0230345 A1* | 11/2004 | Tzamaloukas ......... | G01C 21/26 701/1 |
| 2005/0003844 A1 | 1/2005 | Nishiga et al. | |
| 2007/0191025 A1* | 8/2007 | McBrierty ............ | G01S 5/0027 455/456.2 |
| 2009/0005018 A1* | 1/2009 | Forstall ............. | H04M 3/42348 455/414.1 |
| 2010/0029302 A1* | 2/2010 | Lee ........................ | H04W 4/02 455/456.6 |
| 2011/0035146 A1* | 2/2011 | Guha ................. | G08G 1/09675 701/533 |
| 2011/0261890 A1* | 10/2011 | Nagura ................. | H04L 9/3247 375/259 |
| 2012/0209510 A1* | 8/2012 | Ikawa ................ | G01C 21/3492 701/423 |
| 2012/0323406 A1* | 12/2012 | Yamashiro ............ | G08G 1/161 701/2 |
| 2013/0099941 A1 | 4/2013 | Jana et al. | |
| 2014/0177506 A1 | 6/2014 | Korus et al. | |
| 2015/0278546 A1 | 10/2015 | Uekubo et al. | |

FOREIGN PATENT DOCUMENTS

| | | |
|---|---|---|
| CN | 202435435 U | 9/2012 |
| CN | 202979031 U | 6/2013 |
| JP | 2004078562 A | 3/2004 |
| JP | 2004241866 A | 8/2004 |
| JP | 2005348203 A | 12/2005 |
| JP | 2009244204 A | 10/2009 |
| JP | 2010068282 A | 3/2010 |
| JP | 2011058909 A | 3/2011 |
| WO | 2014057636 A1 | 4/2014 |

OTHER PUBLICATIONS

Machine Translation and Abstract of Chinese Publication No. CN102638768, Aug. 15, 2012, 22 pages.
Machine Translation and Abstract of Chinese Publication No. CN202435435, Sep. 12, 2012, 8 pages.
Machine Translation and Abstract of Chinese Publication No. CN202979031, Jun. 5, 2013, 16 pages.
Machine Translation and Abstract of Japanese Publication No. JP2009244204, Part 1, Oct. 22, 2009, 19 pages.
Machine Translation and Abstract of Japanese Publication No. JP2009244204, Part 2, Oct. 22, 2009, 4 pages.
Foreign Communication From a Counterpart Application, European Application No. 14903552.9, Extended European Search Report dated Jul. 21, 2017, 8 pages.
Foreign Communication From a Counterpart Application, PCT Application No. PCT/CN2014/088128, English Translation of International Search Report dated Jun. 30, 2015, 2 pages.
Foreign Communication From a Counterpart Application, PCT Application No. PCT/CN2014/088128, English Translation of Written Opinion dated Jun. 30, 2015, 8 pages.
Machine Translation and Abstract of Japanese Publication No. JP2005348203, Dec. 15, 2005, 23 pages.
Machine Translation and Abstract of Japanese Publication No. JP2010068282, Mar. 25, 2010, 29 pages.
Machine Translation and Abstract of Japanese Publication No. JP2011058909, Mar. 24, 2011, 14 pages.
Foreign Communication From a Counterpart Application, Japanese Application No. 2017-518970, Japanese Office Action dated May 29, 2018, 7 pages.
Foreign Communication From a Counterpart Application, Japanese Application No. 2017-518970, English Translation of Japanese Office Action dated May 29, 2018, 10 pages.

\* cited by examiner

METHOD FOR EXCHANGING INFORMATION BETWEEN IN-VEHICLE TERMINALS AND IN-VEHICLE TERMINAL

CROSS-REFERENCE TO RELATED APPLICATIONS

This application is a national stage application of International Patent Application No. PCT/CN2014/088128, filed on Oct. 8, 2014, which is hereby incorporated by reference in its entirety.

TECHNICAL FIELD

The disclosure relates to the field of intelligent in-vehicle technologies, and in particular, to a method for exchanging information between in-vehicle terminals, and an in-vehicle terminal.

BACKGROUND

Currently, with economic development and improvement of a living standard of people, a quantity of vehicles in society grows increasingly. Especially in economically developed urban regions, the growth of the quantity of vehicles is particularly obvious. In this situation, safety and comfort of user driving have become a hotspot of an intelligent automobile. How to extend a range of information exchange between in-vehicle terminals, so that more vehicles can intelligently exchange information, and exchange different information with different in-vehicle terminals. Properly protecting privacy information has become a primary technical problem.

In the prior art, LUBAOHEZI launched by Tencent company is mainly based on a traffic congestion situation shared between friends, or mutual PK after driving is scored. Lubaohezi may further present user habits such as abrupt deceleration/turn/acceleration in a data manner, and a user can adjust driving according to scores. In addition, it may further enable an automobile to be interconnected to a Tencent cloud service, and provide services such as vehicle diagnosis and fuel consumption analysis. However, an in-vehicle terminal can only transmit and share information between friends, but cannot transmit and share information with an encountered person. Therefore, an information transmission and sharing scenario is limited, shareable data information types are insufficient, driving safety factors of a user are not fully considered, and information privacy protection related to driving is also not fully considered.

BENBEN is a mobile social networking tool, which is based on a geographical location, with respect to a user having a vehicle. Similar to momo, the user may enter vehicle information of the user, and invite other persons to build a motorcade, or the user may join in another motorcade. After a group is established, group members are mutually in a trust relationship by default. All operations need to be performed by the user. A process of establishing a motorcade is still performed by a person, and vehicle intelligence is not reflected. Once a motorcade is established, group members are mutually in a trust relationship by default, a social relationship between the group members is excessively undiversified, and data privacy protection related to driving is not fully considered.

In conclusion, a method for exchanging information between in-vehicle terminals, and an in-vehicle terminal need to be provided, to extend a range of information exchange between in-vehicle terminals, so that more vehicles can intelligently exchange in-vehicle information, and exchange different information with different in-vehicle terminals. This can properly protect privacy information.

SUMMARY

Embodiments of the disclosure provide a method for exchanging information between in-vehicle terminals, and an in-vehicle terminal, to extend a range of information exchange between in-vehicle terminals, so that more vehicles can intelligently exchange in-vehicle information, and exchange different information with different in-vehicle terminals. This can properly protect privacy information.

According to a first aspect, a method for exchanging information between in-vehicle terminals is provided, including sending, by a first in-vehicle terminal, a broadcast message, where the broadcast message carries an identifier of the first in-vehicle terminal; establishing, by the first in-vehicle terminal, a first relationship with at least one second in-vehicle terminal that receives the broadcast message; establishing, by the first in-vehicle terminal, a second relationship with at least one third in-vehicle terminal; and separately exchanging, by the first in-vehicle terminal, information about a correspondence type with the at least one second in-vehicle terminal and the at least one third in-vehicle terminal.

In a first possible implementation manner, the establishing, by the first in-vehicle terminal, a first relationship with at least one second in-vehicle terminal that receives the broadcast message includes receiving, by the first in-vehicle terminal, a first relationship establishment request message sent by the at least one second in-vehicle terminal, where the first relationship establishment request message carries the identifier of the first in-vehicle terminal and an identifier of the at least one second in-vehicle terminal; and sending, by the first in-vehicle terminal, a first relationship establishment confirmation message to the at least one second in-vehicle terminal according to the identifier of the at least one second in-vehicle terminal, to establish the first relationship, where the first relationship establishment confirmation message carries the identifier of the first in-vehicle terminal and the identifier of the at least one second in-vehicle terminal.

With reference to the first aspect, in a second possible implementation manner, the establishing, by the first in-vehicle terminal, a second relationship with at least one third in-vehicle terminal includes establishing, by the first in-vehicle terminal, the second relationship with the at least one third in-vehicle terminal selected from the at least one second in-vehicle terminal.

With reference to the second possible implementation manner of the first aspect, in a third possible implementation manner, the establishing, by the first in-vehicle terminal, the second relationship with the at least one third in-vehicle terminal selected from the at least one second in-vehicle terminal includes selecting, by the first in-vehicle terminal according to a specified rule or a selection indication entered by a user, the at least one third in-vehicle terminal for establishing the second relationship from the at least one second in-vehicle terminal; sending, by the first in-vehicle terminal, a second relationship establishment request message to the at least one third in-vehicle terminal, so that the at least one third in-vehicle terminal determines, according to the specified rule, whether to agree to establish the second relationship; and receiving, by the first in-vehicle terminal, a second relationship establishment confirmation message sent by the at least one third in-vehicle terminal, to establish the second relationship.

With reference to the third possible implementation manner of the first aspect, in a fourth possible implementation manner, the method further includes recording, by the first in-vehicle terminal in a relational database according to the identifier of the at least one second in-vehicle terminal and/or an identifier of the at least one third in-vehicle terminal, a quantity of times of establishing the first relationship with the at least one second in-vehicle terminal in a valid time period, recording a quantity of times of establishing the second relationship with the at least one third in-vehicle terminal in the valid time period, and recording the information exchanged with the at least one second in-vehicle terminal or third in-vehicle terminal.

With reference to the fourth possible implementation manner of the first aspect, in a fifth possible implementation manner, the specified rule includes at least one of the following: according to destination information included in the information, a quantity of times that the first in-vehicle terminal and the at least one second in-vehicle terminal share a same destination is greater than a first specified threshold; or a quantity of times that the first in-vehicle terminal establishes the first relationship with the at least one second in-vehicle terminal is greater than a second specified threshold; or a quantity of times that the first in-vehicle terminal establishes the second relationship with the at least one third in-vehicle terminal is greater than a third specified threshold.

With reference to the fifth possible implementation manner of the first aspect, in a sixth possible implementation manner, the method further includes: updating, by the first in-vehicle terminal, a relationship with the at least one third in-vehicle terminal that does not meet the specified rule in a valid time or that is indicated by a relationship change indication entered by the user, to the first relationship.

With reference to the first aspect, in a seventh possible implementation manner, the exchanging, by the first in-vehicle terminal, information about a correspondence type with the at least one second in-vehicle terminal and/or the at least one third in-vehicle terminal separately includes exchanging, by the first in-vehicle terminal, first type information and second type information with the at least one second in-vehicle terminal and the at least one third in-vehicle terminal respectively, where the first type information includes non-privacy information, and the first relationship is an encounter relationship; and the second type information includes privacy information and non-privacy information, and the second relationship is a friend relationship.

With reference to the first aspect, in an eighth possible implementation manner, the broadcast message further carries a vehicle type of an in-vehicle terminal that exchanges information with the first in-vehicle terminal, and a vehicle type of the at least one second in-vehicle terminal is consistent with the vehicle type carried in the broadcast message.

With reference to the first aspect, in a ninth possible implementation manner, the method further includes separately sending, by the first in-vehicle terminal, a positioning information request to the at least one second in-vehicle terminal or the at least one third in-vehicle terminal that has established the first relationship and/or the second relationship with the first in-vehicle terminal; receiving, by the first in-vehicle terminal, positioning information sent by the at least one second in-vehicle terminal and/or the at least one third in-vehicle terminal; and determining, by the first in-vehicle terminal, a current location of the first in-vehicle terminal according to the positioning information sent by the at least one second in-vehicle and/or the at least one third in-vehicle terminal.

According to a second aspect, an in-vehicle terminal is provided, including a first sending unit, configured to send a broadcast message, where the broadcast message carries an identifier of a first in-vehicle terminal; a first establishment unit, configured to establish a first relationship with at least one second in-vehicle terminal that receives the broadcast message; a second establishment unit, configured to establish a second relationship with at least one third in-vehicle terminal; and an exchange unit, configured to separately exchange information about a correspondence type with the at least one second in-vehicle terminal and the at least one third in-vehicle terminal.

In a first possible implementation manner, the first establishment unit includes a first receiving unit, configured to receive a first relationship establishment request message sent by the at least one second in-vehicle terminal, where the first relationship establishment request message carries the identifier of the first in-vehicle terminal and an identifier of the at least one second in-vehicle terminal; and a second sending unit, configured to send a first relationship establishment confirmation message to the at least one second in-vehicle terminal according to the identifier of the at least one second in-vehicle terminal, to establish the first relationship, where the first relationship establishment confirmation message carries the identifier of the first in-vehicle terminal and the identifier of the at least one second in-vehicle terminal.

With reference to the second aspect, in a second possible implementation manner, the second establishment unit is configured to establish the second relationship with the at least one third in-vehicle terminal selected from the at least one second in-vehicle terminal.

With reference to the second possible implementation manner of the second aspect, in a third possible implementation manner, the second establishment unit includes: a selection unit, configured to select, according to a specified rule or a selection indication entered by a user, the at least one third in-vehicle terminal for establishing the second relationship from the at least one second in-vehicle terminal; a third sending unit, configured to send a second relationship establishment request message to the at least one third in-vehicle terminal, so that the at least one third in-vehicle terminal determines, according to the specified rule, whether to agree to establish the second relationship; and a second receiving unit, configured to receive a second relationship establishment confirmation message sent by the at least one third in-vehicle terminal, to establish the second relationship.

With reference to the third possible implementation manner of the second aspect, in a fourth possible implementation manner, the in-vehicle terminal further includes a recording unit, configured to: record, in a relational database according to the identifier of the at least one second in-vehicle terminal and/or an identifier of the at least one third in-vehicle terminal, a quantity of times of establishing the first relationship with the at least one second in-vehicle terminal in a valid time period, record a quantity of times of establishing the second relationship with the at least one third in-vehicle terminal in the valid time period, and record the information exchanged with the at least one second in-vehicle terminal or third in-vehicle terminal.

With reference to the fourth possible implementation manner of the second aspect, in a fifth possible implementation manner, the specified rule includes at least one of the following: according to destination information included in the information, a quantity of times that the first in-vehicle terminal and the at least one second in-vehicle terminal share a same destination is greater than a first specified threshold; or a quantity of times that the first in-vehicle terminal establishes the first relationship with the at least one second in-vehicle terminal is greater than a second specified threshold; or a quantity of times that the first in-vehicle terminal establishes the second relationship with the at least one third in-vehicle terminal is greater than a third specified threshold.

With reference to the fifth possible implementation manner of the second aspect, in a sixth possible implementation manner, the in-vehicle terminal further includes an update unit, configured to update a relationship with the at least one third in-vehicle terminal that does not meet the specified rule in a valid time or that is indicated by a relationship change indication entered by the user, to the first relationship.

With reference to the second aspect, in a seventh possible implementation manner, the exchange unit is configured to exchange first type information and second type information with the at least one second in-vehicle terminal and the at least one third in-vehicle terminal respectively, where the first type information includes non-privacy information, and the first relationship is an encounter relationship; and the second type information includes privacy information and non-privacy information, and the second relationship is a friend relationship.

With reference to the second aspect, in an eighth possible implementation manner, the broadcast message further carries a vehicle type of an in-vehicle terminal that exchanges information with the first in-vehicle terminal, and a vehicle type of the at least one second in-vehicle terminal is consistent with the vehicle type carried in the broadcast message.

With reference to the second aspect, in a ninth possible implementation manner, the in-vehicle terminal further includes a fourth sending unit, configured to separately send a positioning information request to the at least one second in-vehicle terminal or the at least one third in-vehicle terminal that has established the first relationship and/or the second relationship with the first in-vehicle terminal; a third receiving unit, configured to receive positioning information sent by the at least one second in-vehicle terminal and/or the at least one third in-vehicle terminal; and a determining unit, configured to determine a current location of the first in-vehicle terminal according to the positioning information sent by the at least one second in-vehicle and/or the at least one third in-vehicle terminal.

According to a third aspect, an in-vehicle terminal is provided, including an input apparatus, an output apparatus, a memory, and a processor, where the processor is configured to perform the following steps: sending a broadcast message, where the broadcast message carries an identifier of a first in-vehicle terminal; establishing a first relationship with at least one second in-vehicle terminal that receives the broadcast message; establishing a second relationship with at least one third in-vehicle terminal; and separately exchanging information about a correspondence type with the at least one second in-vehicle terminal and the at least one third in-vehicle terminal.

In a first possible implementation manner, the step, which is performed by the processor, of establishing a first relationship with at least one second in-vehicle terminal that receives the broadcast message includes receiving a first relationship establishment request message sent by the at least one second in-vehicle terminal, where the first relationship establishment request message carries the identifier of the first in-vehicle terminal and an identifier of the at least one second in-vehicle terminal; and sending a first relationship establishment confirmation message to the at least one second in-vehicle terminal according to the identifier of the at least one second in-vehicle terminal, to establish the first relationship, where the first relationship establishment confirmation message carries the identifier of the first in-vehicle terminal and the identifier of the at least one second in-vehicle terminal.

With reference to the third aspect, in a second possible implementation manner, the step, which is performed by the processor, of establishing a second relationship with at least one third in-vehicle terminal includes establishing the second relationship with the at least one third in-vehicle terminal selected from the at least one second in-vehicle terminal.

With reference to the second possible implementation manner of the third aspect, in a third possible implementation manner, the step, which is performed by the processor, of establishing the second relationship with the at least one third in-vehicle terminal selected from the at least one second in-vehicle terminal includes selecting, according to a specified rule or a selection indication entered by a user, the at least one third in-vehicle terminal for establishing the second relationship from the at least one second in-vehicle terminal; sending a second relationship establishment request message to the at least one third in-vehicle terminal, so that the at least one third in-vehicle terminal determines, according to the specified rule, whether to agree to establish the second relationship; and receiving a second relationship establishment confirmation message sent by the at least one third in-vehicle terminal, to establish the second relationship.

With reference to the third possible implementation manner of the third aspect, in a fourth possible implementation manner, the processor further performs the following steps: recording, in a relational database according to the identifier of the at least one second in-vehicle terminal and/or an identifier of the at least one third in-vehicle terminal, a quantity of times of establishing the first relationship with the at least one second in-vehicle terminal in a valid time period, recording a quantity of times of establishing the second relationship with the at least one third in-vehicle terminal in the valid time period, and recording the information exchanged with the at least one second in-vehicle terminal or third in-vehicle terminal.

With reference to the fourth possible implementation manner of the third aspect, in a fifth possible implementation manner, the specified rule includes at least one of the following: according to destination information included in the information, a quantity of times that the first in-vehicle terminal and the at least one second in-vehicle terminal share a same destination is greater than a first specified threshold; or a quantity of times that the first in-vehicle terminal establishes the first relationship with the at least one second in-vehicle terminal is greater than a second specified threshold; or a quantity of times that the first in-vehicle terminal establishes the second relationship with the at least one third in-vehicle terminal is greater than a third specified threshold.

With reference to the fifth possible implementation manner of the third aspect, in a sixth possible implementation manner, the processor further performs updating a relationship with the at least one third in-vehicle terminal that does not meet the specified rule in a valid time or that is indicated by a relationship change indication entered by the user, to the first relationship.

With reference to the third aspect, in a seventh possible implementation manner, the step, which is performed by the processor, of exchanging information about a correspondence type with the at least one second in-vehicle terminal and/or the at least one third in-vehicle terminal separately is exchanging first type information and second type information with the at least one second in-vehicle terminal and the at least one third in-vehicle terminal respectively, where the first type information includes non-privacy information, and the first relationship is an encounter relationship; and the second type information includes privacy information and non-privacy information, and the second relationship is a friend relationship.

With reference to the third aspect, in an eighth possible implementation manner, the broadcast message further carries a vehicle type of an in-vehicle terminal that exchanges information with the first in-vehicle terminal, and a vehicle type of the at least one second in-vehicle terminal is consistent with the vehicle type carried in the broadcast message.

With reference to the third aspect, in a ninth possible implementation manner, the processor further performs the following steps: separately sending a positioning information request to the at least one second in-vehicle terminal or the at least one third in-vehicle terminal that has established the first relationship and/or the second relationship with the first in-vehicle terminal; receiving positioning information sent by the at least one second in-vehicle terminal and/or the at least one third in-vehicle terminal; and determining a current location of the first in-vehicle terminal according to the positioning information sent by the at least one second in-vehicle and/or the at least one third in-vehicle terminal.

By means of the method for exchanging information between in-vehicle terminals and the in-vehicle terminal that are provided in the embodiments of the disclosure, a first in-vehicle terminal triggers, by sending a broadcast message, at least one surrounding second in-vehicle terminal to establish a first relationship with the first in-vehicle terminal, and establishes a second relationship with at least one third in-vehicle terminal, and the first in-vehicle terminal separately exchanges information about a correspondence type with the at least one second or third in-vehicle terminal. Therefore, a range of information exchange between in-vehicle terminals can be extended, so that more vehicles can intelligently exchange in-vehicle information, and exchange different information with different in-vehicle terminals. This can properly protect privacy information.

BRIEF DESCRIPTION OF DRAWINGS

To describe the technical solutions in the embodiments of the disclosure or in the prior art more clearly, the following briefly describes the accompanying drawings required for describing the embodiments. The accompanying drawings in the following description show merely some embodiments of the disclosure, and a person of ordinary skill in the art may still derive other drawings from these accompanying drawings without creative efforts.

DESCRIPTION OF EMBODIMENTS

The following clearly and completely describes the technical solutions in the embodiments of the disclosure with reference to the accompanying drawings in the embodiments of the disclosure. Apparently, the described embodiments are merely some but not all of the embodiments of the disclosure. All other embodiments obtained by a person of ordinary skill in the art based on the embodiments of the disclosure without creative efforts shall fall within the protection scope of the disclosure.

When a user drives an automobile on a road, for example, on a highway, a road condition is complex, or when it is at rush hours, and traffic is congested, the user needs to temporarily share and exchange some safe driving information with other vehicles on the road, to improve driving safety. Alternatively, when a user is having a self-driving trip, the user intends to exchange information with an automobile driven by a friend, to improve driving safety and comfort. The embodiments of the disclosure provide a method for exchanging information between in-vehicle terminals, an apparatus, and a device. A first in-vehicle terminal triggers, by sending a broadcast message, at least one surrounding second in-vehicle terminal to establish a first relationship with the first in-vehicle terminal, and establishes a second relationship with at least one third in-vehicle terminal, and the first in-vehicle terminal separately exchanges information about a correspondence type with the at least one second or third in-vehicle terminal. Therefore, a range of information exchange between in-vehicle terminals can be extended, so that more vehicles can intelligently exchange in-vehicle information, and exchange different information with different in-vehicle terminals. This can properly protect privacy information.

Figure 1:
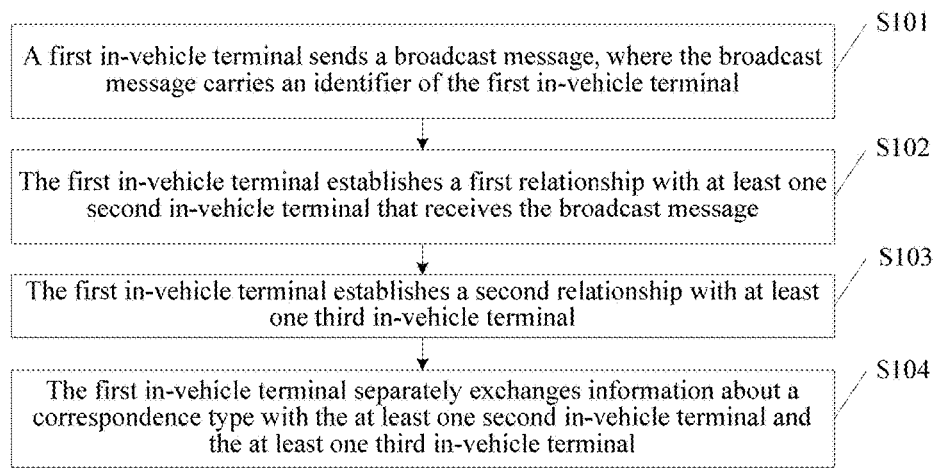
FIG. 1 is a flowchart of a method for exchanging information between in-vehicle terminals according to an embodiment of the disclosure.

Referring to FIG. 1, FIG. 1 is a flowchart of a method for exchanging information between in-vehicle terminals according to an embodiment of the disclosure. The method includes the following steps.

Step S101: A first in-vehicle terminal sends a broadcast message, where the broadcast message carries an identifier of the first in-vehicle terminal.

An in-vehicle terminal A automatically sends a broadcast message or a broadcast frame periodically. In a particular distance, another in-vehicle terminal may receive the broadcast message or the broadcast frame. The in-vehicle terminal A may use multiple manners for sending the broadcast message, for example, send the broadcast message in a local network or a cellular network. The broadcast message or the broadcast frame may further carry an identifier of the in-vehicle terminal A. The in-vehicle terminal A has a unique in-vehicle terminal identifier, which is pre-configured by an in-vehicle terminal vendor.

Step S102: The first in-vehicle terminal establishes a first relationship with at least one second in-vehicle terminal that receives the broadcast message.

The in-vehicle terminal A sends the broadcast message, any other in-vehicle terminal that receives the broadcast message may communicate with the in-vehicle terminal A, and a relationship with the in-vehicle terminal may be established through communication.

The relationship herein is established by being triggered by broadcast, and any in-vehicle terminal that receives the broadcast message may establish this relationship with the in-vehicle terminal A. Therefore, the relationship may be referred to as an encounter relationship.

Step S103: The first in-vehicle terminal establishes a second relationship with at least one third in-vehicle terminal.

The in-vehicle terminal A may further establish a second relationship with any in-vehicle terminal. The any in-vehicle terminal may be specified by an in-vehicle user or selected from the second in-vehicle terminal according to a specified rule. For example, after establishing first relationships with multiple second in-vehicle terminals, the in-vehicle terminal A may further select some in-vehicle terminals, that is, third in-vehicle terminals, from the multiple second in-vehicle terminals according to a particular rule, and establish second relationships with the third in-vehicle terminals in a point-to-point manner and the like. The second relationship may be a friend relationship.

Step S104: The first in-vehicle terminal separately exchanges information about a correspondence type with the at least one second in-vehicle terminal and the at least one third in-vehicle terminal.

In the foregoing steps, the in-vehicle terminal A establishes different relationships with the second in-vehicle terminal and the third in-vehicle terminal separately, and information of different types may be exchanged therebetween separately.

First, the in-vehicle terminal A collects information about vehicle driving and a status by using a controller area network (CAN) bus, where the information includes: tire pressure, a brake operating status, an engine operating status, a driving speed, a vehicle type, a fuel consumption status, and the like. The in-vehicle terminal A collects user status information by using a sensor or by connecting to Bluetooth® of a wearable device, where the information includes: a fatigue degree of a user, alcohol content of a driver, an emotional status of the driver, and the like. The in-vehicle terminal A collects driving action information of a vehicle by using an in-vehicle sensor, where the information includes: a left turn, a right turn, braking, turning around, backing, merging, and the like of a vehicle. The in-vehicle terminal A collects some privacy information of the user by accessing another application, where the information includes: a driving route, a driving destination, and the like. An in-vehicle terminal B may also collect driving data of the in-vehicle terminal B in these manners. These information may be referred to as in-vehicle information.

Figure 2:
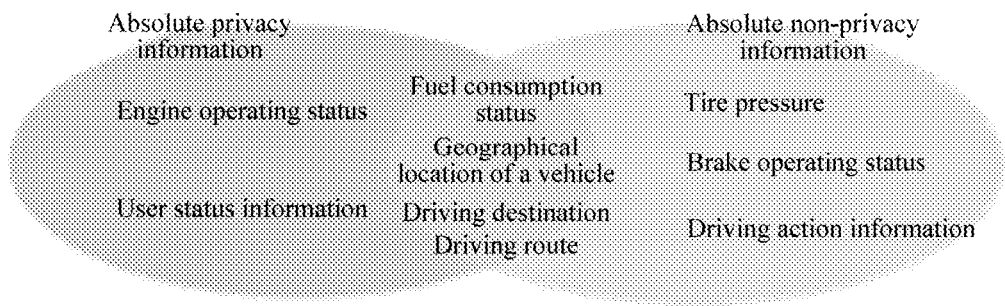
FIG. 2 is a schematic diagram of categorizing automobile running data and driver status information.

Then, the in-vehicle terminal A categorizes the collected information, for example, the information may be categorized into absolute privacy information and absolute non-privacy information according to a rule preset by the user, and an overlapped part of the information may be categorized into privacy information or non-privacy information. As shown in the schematic diagram of categorizing automobile running data and driver status information in FIG. 2, some information that involves user privacy, such as the engine operating status and the user status information, is categorized as absolute privacy information; information that does not involve user privacy, such as the tire pressure, the brake operating status, and the driving action information, is categorized as absolute non-privacy information; and information that is neither private nor non-private, such as the fuel consumption status, the geographical location of the vehicle, the driving destination, and the driving route, may be categorized as privacy information or may be categorized as non-privacy information according to the preset rule.

The in-vehicle terminal A may determine, according to the relationship established with the second or third in-vehicle terminal, a type of in-vehicle information shared or exchanged with the second or third in-vehicle terminal. For example, the in-vehicle terminal A exchanges only absolute non-privacy information with a second in-vehicle terminal with which a first relationship is established, and may exchange absolute non-privacy information and absolute privacy information with a second in-vehicle terminal with which a second relationship is established. The in-vehicle terminal A sends in-vehicle information of the in-vehicle terminal A to the second or third in-vehicle terminal, and also receives in-vehicle information of the in-vehicle terminal from the second or third in-vehicle terminal. In this way, the in-vehicle terminal A establishes different relationships with different in-vehicle terminals in different communication manners, exchanges information of different types for the established different relationships, so that not only in-vehicle information can be exchanged with more in-vehicle terminals, and driving safety and comfort are improved by using the obtained in-vehicle information, but also information of different types is exchanged automatically with different in-vehicle terminals. This can properly protect privacy information of the user.

As can be seen, according to the method for exchanging information between in-vehicle terminals provided in this embodiment of the disclosure, a first in-vehicle terminal triggers, by sending a broadcast message, at least one surrounding second in-vehicle terminal to establish a first relationship with the first in-vehicle terminal, and establishes a second relationship with at least one third in-vehicle terminal, and the first in-vehicle terminal separately exchanges information about a correspondence type with the at least one second or third in-vehicle terminal. Therefore, a range of information exchange between in-vehicle terminals can be extended, so that more vehicles can intelligently exchange in-vehicle information, and exchange different information with different in-vehicle terminals. This can properly protect privacy information.

Figure 3A:
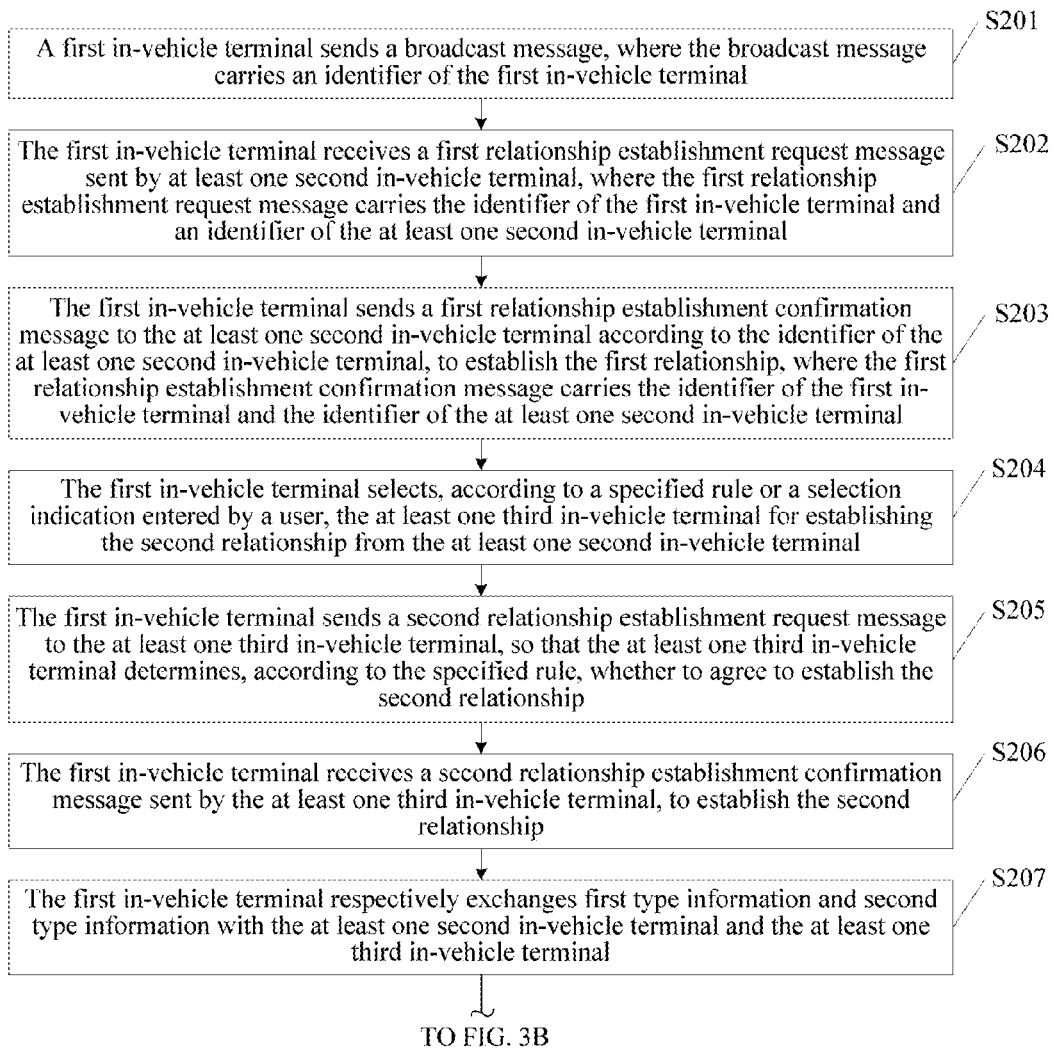
FIG. 3A and FIG. 3B are a flowchart of another method for exchanging information between in-vehicle terminals according to an embodiment of the disclosure.
Figure 3B:
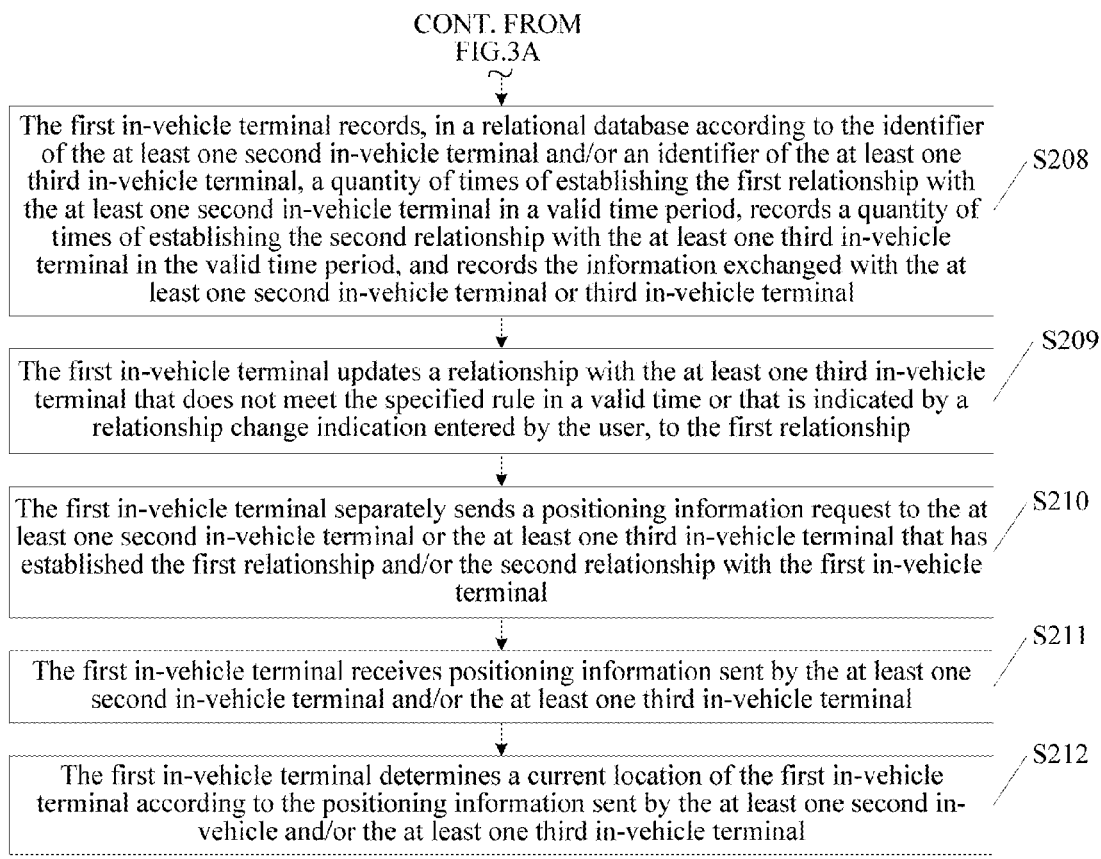

Referring to FIG. 3A and FIG. 3B, FIG. 3A and FIG. 3B are a flowchart of another method for exchanging information between in-vehicle terminals according to an embodiment of the disclosure. The method includes the following steps.

Step S201: A first in-vehicle terminal sends a broadcast message, where the broadcast message carries an identifier of the first in-vehicle terminal.

An in-vehicle terminal A automatically sends a broadcast message or a broadcast frame periodically, and in a particular distance, another in-vehicle terminal may receive the broadcast message or the broadcast frame. The broadcast message or the broadcast frame may carry an identifier of the in-vehicle terminal A. The in-vehicle terminal A has a unique in-vehicle terminal identifier, which is pre-configured by an in-vehicle terminal vendor.

The in-vehicle terminal A may send the broadcast message to another in-vehicle terminal by means of a connection to a local network, and a specific manner is as follows: The in-vehicle terminal A configures a local WI-FI hotspot, and automatically configures a service set identifier (SSID) and a password, generates a broadcast message, and places the broadcast message into a WI-FI broadcast (Beacon) frame, where a method is to add a Vendor specific element to the tail of the Beacon frame. A specific element structure is shown in the following Table 1:

TABLE 1

Vendor specific element structure

| Element ID | Length | Organization identifier | In-vehicle terminal identifier | Vehicle type |
|---|---|---|---|---|

The element identifier (ID) specifies an element ID used by an additional Vendor specific element to trigger a subsequent encounter relationship establishment process by assisting in broadcasting an in-vehicle terminal identifier. The organization identifier represents an organization that defines broadcast frame information used to establish a social relationship. Behind the organization identifier is the in-vehicle terminal identifier. A vehicle type may be added behind the in-vehicle terminal identifier. The broadcast information is sent periodically together with the Beacon frame. Another in-vehicle terminal, for example, an in-vehicle terminal B, receives the Beacon frame, and parses out a broadcast message.

A social broadcast frame may also be formed independently, and is broadcast in a WI-FI environment periodically at a particular time interval. A structure of the broadcast frame is shown in the following Table 2:

TABLE 2

Structure of a broadcast frame

| Order | Information |
|---|---|
| 1 | Timestamp (Timestamp) |
| 2 | Broadcast interval |
| 3 | Vendor specific |

The Order represents an order of information (Information) in a broadcast frame. Vendor specific element information is shown in the following Table 3:

TABLE 3

Vendor specific element information structure

| Element ID | Length | Organization identifier | In-vehicle terminal identifier | In-vehicle type |
|---|---|---|---|---|

The element ID specifies an element ID used by an additional Vendor specific element to trigger a subsequent encounter relationship establishment process by assisting in broadcasting an in-vehicle terminal identifier. The organization identifier represents an organization that defines broadcast frame information used to establish a social relationship. Behind the organization identifier is the in-vehicle terminal identifier. The in-vehicle terminal A may also establish a relationship by means of a connection to a cellular network, and the in-vehicle terminal A exchanges information with another in-vehicle terminal by using a base station. Optionally, the broadcast message may further carry a nickname of the in-vehicle terminal A. By enabling another in-vehicle terminal to obtain the nickname of the in-vehicle terminal A, information exchange between the in-vehicle terminals may be more friendly and more interesting. The nickname may be configured by an in-vehicle terminal vendor, and subsequently a user may change the nickname of the in-vehicle terminal. For example, the nickname may be set by using a user interface of an in-vehicle intelligent terminal, or may be set by an intelligent terminal of the user. The intelligent terminal of the user connects to the vehicle intelligent terminal by means of BLUETOOTH, ZIGBEE, or WI-FI, or in a near field communication (NFC) form, finds an "in-vehicle terminal nickname setting" option, sets a nickname of the in-vehicle terminal after selecting the option, and sends the nickname of the in-vehicle terminal to the vehicle intelligent terminal by means of the foregoing wireless technology, and after receiving a nickname update message, the vehicle intelligent terminal updates the nickname of the in-vehicle terminal.

Optionally, the broadcast message may further carry an in-vehicle type of another in-vehicle terminal that requests to exchange in-vehicle information. By specifying an in-vehicle type, in a scenario in which there is an excessively large quantity of in-vehicle terminals, some in-vehicle terminals may be filtered out. For example, in a scenario in which some vehicles have complex statuses, attention may be paid only to dangerous vehicles, that is, the first relationship is established only with an in-vehicle terminal whose in-vehicle type is consistent with the in-vehicle type. Certainly, in a filtering policy, limiting a WI-FI transmit power of the in-vehicle terminal and disabling an in-vehicle information exchange function of the in-vehicle terminal may also be selected.

Step S202: The first in-vehicle terminal receives a first relationship establishment request message sent by at least one second in-vehicle terminal, where the first relationship establishment request message carries the identifier of the first in-vehicle terminal and an identifier of the at least one second in-vehicle terminal.

The in-vehicle terminal A triggers, by sending a broadcast message, another in-vehicle terminal that receives the broadcast message, for example, an in-vehicle terminal B. If the in-vehicle terminal B intends to establish a relationship with the in-vehicle terminal A, the in-vehicle terminal B sends a relationship establishment request message to the in-vehicle terminal A, that is, the in-vehicle terminal B parses the broadcast message, acquires an identifier of the in-vehicle terminal A, and sends the request message to the in-vehicle terminal A corresponding to the identifier. Moreover, the request message carries the identifier of the in-vehicle terminal A and an identifier of the in-vehicle terminal B, and the in-vehicle terminals A and B have a unique identifier respectively.

Step S203: The first in-vehicle terminal sends a first relationship establishment confirmation message to the at least one second in-vehicle terminal according to the identifier of the at least one second in-vehicle terminal, to establish the first relationship, where the first relationship establishment confirmation message carries the identifier of the first in-vehicle terminal and the identifier of the at least one second in-vehicle terminal.

After the in-vehicle terminal A receives the relationship establishment request message sent by the in-vehicle terminal B, if the in-vehicle terminal A agrees to establish a relationship with the in-vehicle terminal B, the in-vehicle terminal A sends a relationship establishment confirmation message to the in-vehicle terminal B corresponding to the identifier of the in-vehicle terminal B, to establish the relationship.

The relationship herein is established by being triggered by broadcast, and any in-vehicle terminal that receives the broadcast message may establish this relationship with the in-vehicle terminal A. Therefore, the relationship may be referred to as an encounter relationship.

The first relationship establishment request message and the first relationship establishment confirmation message in step S202 and step S203 may be sent in a broadcast, unicast, or multicast form.

Step S204: The first in-vehicle terminal selects, according to a specified rule or a selection indication entered by a user, at least one third in-vehicle terminal for establishing the second relationship from the at least one second in-vehicle terminal.

After establishing encounter relationships with some in-vehicle terminals, the in-vehicle terminal A may select, according to a particular rule and data in a relational database, some in-vehicle terminals from these in-vehicle terminals to establish second relationships, or may establish, according to a selection indication entered by the user, a second relationship with an indicated in-vehicle terminal, where the second relationship may be a friend relationship.

The specified rule includes at least one of the following: according to destination information included in the first in-vehicle information, a quantity of times that the first in-vehicle terminal establishing the first relationship and the second in-vehicle terminal share a same destination is greater than a first specified threshold; or a quantity of times that the first in-vehicle terminal establishes the first relationship with the second in-vehicle terminal is greater than a second specified threshold, where the first relationship may be an encounter relationship; or a quantity of times that the first in-vehicle terminal establishes the second relationship with the third in-vehicle terminal is greater than a third specified threshold, where the second relationship herein may be a friend relationship, and the third specified threshold may be 0.

The specified rule is mainly to filter, according to histories of the in-vehicle terminal A and another in-vehicle terminal, an in-vehicle terminal for establishing a friend relationship with the in-vehicle terminal A. The specified rule may be set or updated by the user, or may be generated by the in-vehicle terminal by means of self-study. A specific implementation manner of the specified rule is not limited herein.

Step S205: The first in-vehicle terminal sends a second relationship establishment request message to the at least one third in-vehicle terminal, so that the at least one third in-vehicle terminal determines, according to the specified rule, whether to agree to establish the second relationship.

Step S206: The first in-vehicle terminal receives a second relationship establishment confirmation message sent by the at least one third in-vehicle terminal, to establish the second relationship.

Similar to establishment of an encounter relationship, the in-vehicle terminal A establishes a friend relationship with the in-vehicle terminal B by requesting establishment and confirming establishment. In-vehicle information exchanged between the in-vehicle terminals between which a friend relationship is established may be non-privacy information and privacy information.

Step S207: The first in-vehicle terminal exchanges first type information and second type information with the at least one second in-vehicle terminal and the at least one third in-vehicle terminal respectively.

The first type information includes non-privacy information, and the first relationship is an encounter relationship.

The second type information includes privacy information and non-privacy information, and the second relationship is a friend relationship.

The in-vehicle terminal A may determine, according to the relationship established with the second or third in-vehicle terminal, a type of in-vehicle information shared or exchanged with the second or third in-vehicle terminal. For example, the in-vehicle terminal A exchanges only absolute non-privacy information with a second in-vehicle terminal with which a first relationship is established, and may exchange absolute non-privacy information and absolute privacy information with a second in-vehicle terminal with which a second relationship is established. The in-vehicle terminal A sends the in-vehicle information of the in-vehicle terminal A to the second or third in-vehicle terminal, and also receives the in-vehicle information of the in-vehicle terminal from the second or third in-vehicle terminal.

For example, the first in-vehicle terminal carries a Beacon frame of an in-vehicle terminal identifier or a social broadcast frame generated by the first in-vehicle terminal, and broadcasts the Beacon frame and the social broadcast frame in a control channel (CCH). The second in-vehicle terminal listens on the control channel, and seeks for a relatively idle shared channel (SCH) in a listening manner. The second in-vehicle terminal maintains an SCH entry table in which a status of each shared channel is recorded and when a shared channel is idle is included. After the Beacon frame that carries the in-vehicle terminal identifier or the social broadcast frame generated by the first in-vehicle terminal are received, a Ready-To-Send (RTS) frame is sent on the control channel. The frame carries information about a selected idle SCH. After determining that the SCH is available, the first in-vehicle terminal sends a Clear-To-Send (CTS) frame on the CCH for confirmation. Then, the two terminals are transferred to the selected SCH to exchange data.

The data exchange may be: 1) The second in-vehicle terminal sends a first relationship establishment request message on a selected SCH, and the first in-vehicle terminal sends an establishment confirmation message after receiving the request; 2) the second in-vehicle terminal sends the establishment confirmation message on the selected SCH; 3) the second in-vehicle terminal and the first in-vehicle terminal perform broadcasting to each other on the selected SCH; and 4) the first in-vehicle terminal exchanges first information with the second in-vehicle terminal on the selected SCH in a broadcast manner.

Step S208: The first in-vehicle terminal records, in a relational database according to the identifier of the at least one second in-vehicle terminal and/or an identifier of the at least one third in-vehicle terminal, a quantity of times of establishing the first relationship with the at least one second in-vehicle terminal in a valid time period, records a quantity of times of establishing the second relationship with the at least one third in-vehicle terminal in the valid time period, and records the information exchanged with the at least one second in-vehicle terminal or third in-vehicle terminal.

According to an identifier of each in-vehicle terminal that has established an encounter relationship or a friend relationship with the first in-vehicle terminal, a quantity of times of establishing encounter relationships or friend relationships with the first in-vehicle terminal and information exchanged therebetween are separately recorded in a relational database, and after an encounter relationship or a friend relationship is established with an in-vehicle terminal corresponding to each identifier once, the quantity of times of establishment of encounter relationships or friend relationships is added by 1. A format of data entered into the database may include: an entering reason, for example, an encounter relationship is established successfully or a friend relationship is established successfully or a same destination is shared, an identifier of a target in-vehicle terminal, and an entering time.

It should be noted that, because a friend relationship or an encounter relationship recorded in an excessively long time may be meaningless, only an encounter relationship or a friend relationship established in a valid time period is saved. The first in-vehicle terminal may set a time for each piece of newly entered data, and when a valid time expires, delete the friend or encounter relationship record recorded in the data. For example, if a quantity of times of establishment of currently recorded encounter relationships is 4, and when a piece of data expires, the quantity of times of establishment of the recorded encounter relationships becomes 3.

Step S209: The first in-vehicle terminal updates a relationship with the at least one third in-vehicle terminal that does not meet the specified rule in a valid time or that is indicated by a relationship change indication entered by the user, to the first relationship.

The in-vehicle terminal A may also change the relationship established with another in-vehicle terminal. Upgrading an encounter relationship to a friend relationship has been described in the foregoing steps. Some third in-vehicle terminals may be selected from the second in-vehicle terminals according to a specified rule or a user indication, and a first relationship is upgraded to a second relationship. However, in a case in which the in-vehicle terminal A and the another vehicle already have a friend relationship, the in-vehicle terminal A may also change a friend relationship to an encounter relationship, that is, after a second relationship is established with the third in-vehicle terminal, if a specified rule is always not met in a valid time, or a user instructs to change the friend relationship, the second relationship may be updated to the first relationship.

Step S210: The first in-vehicle terminal separately sends a positioning information request to the at least one second in-vehicle terminal or the at least one third in-vehicle terminal that has established the first relationship and/or the second relationship with the first in-vehicle terminal.

Step S211: The first in-vehicle terminal receives positioning information sent by the at least one second in-vehicle terminal and/or the at least one third in-vehicle terminal.

Step S212: The first in-vehicle terminal determines a current location of the first in-vehicle terminal according to the positioning information sent by the at least one second in-vehicle and/or the at least one third in-vehicle terminal.

In some scenarios, the in-vehicle terminal A has no positioning function or positioning precision is insufficient, and the in-vehicle terminal A may acquire positioning information of the in-vehicle terminal A from an in-vehicle terminal that has established an encounter relationship and/or a friend relationship with the in-vehicle terminal A, thereby determining a current location of the in-vehicle terminal A. When the location information obtained from the in-vehicle terminal that has established the first or second relationship cannot provide a positioning service that meets a precision requirement, positioning precision is optimized by acquiring location information of an in-vehicle terminal that has established another relationship.

For example, generally, when an in-vehicle terminal is positioned, most in-vehicle terminals located around the in-vehicle terminal are in-vehicle terminals that have established an encounter relationship. Therefore, positioning information may be first acquired from these in-vehicle terminals that have established the encounter relationship. Certainly, first, positioning information of these in-vehicle terminals that have established the encounter relationship needs to be set to non-privacy information, that is, these in-vehicle terminals may share positioning information with an in-vehicle terminal that requests to acquire the positioning information. If not all in-vehicle terminals that have established the encounter relationship set positioning information to non-privacy information, the positioning information acquired by the in-vehicle terminal may be positioning information of some in-vehicle terminals that have established the encounter relationship with the in-vehicle terminal.

Most in-vehicle terminals that have established the encounter relationship may set positioning information to privacy information. To optimize positioning precision, positioning information needs to be further acquired from an in-vehicle terminal that has established a friend relationship with the in-vehicle terminal. In-vehicle terminals that have established a friend relationship may generally share positioning information.

The user may consider that positioning information provided by a friend is more believable. Therefore, positioning information may also be first acquired from an in-vehicle terminal that has established a friend relationship. To optimize positioning precision, then positioning information is further acquired from an in-vehicle terminal that has established an encounter relationship with the in-vehicle terminal.

As can be seen, according to the method for exchanging information between in-vehicle terminals provided in this embodiment of the disclosure, a first in-vehicle terminal triggers, by sending a broadcast message, at least one surrounding second in-vehicle terminal to establish a first relationship with the first in-vehicle terminal, and selects at least one third in-vehicle terminal from the at least one second in-vehicle terminal to establish a second relationship with the first in-vehicle terminal, and the first in-vehicle terminal separately exchanges information about a correspondence type with the at least one second or third in-vehicle terminal. Therefore, a range of information exchange between in-vehicle terminals can be extended, so that more vehicles can intelligently exchange in-vehicle information, and exchange different information with different in-vehicle terminals. This can properly protect privacy information. In addition, an in-vehicle terminal may be positioned by using positioning information in different relationships.

Figure 4:
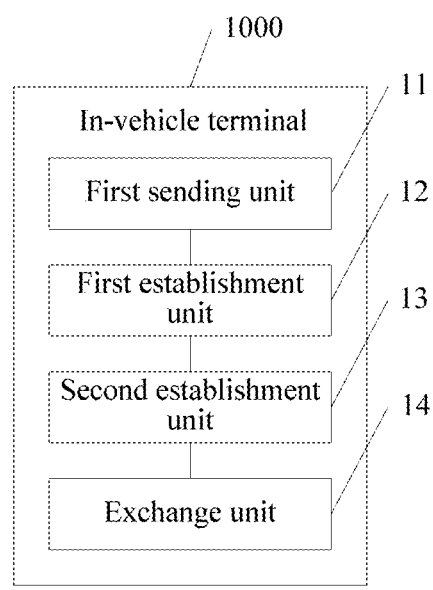
FIG. 4 is a schematic structural diagram of an in-vehicle terminal according to an embodiment of the disclosure.

Referring to FIG. 4, FIG. 4 is a schematic structural diagram of an in-vehicle terminal according to an embodiment of the disclosure. The in-vehicle terminal 1000 includes: a first sending unit 11, a first establishment unit 12, a second establishment unit 13, and an exchange unit 14.

The first sending unit 11 is configured to send a broadcast message, where the broadcast message carries an identifier of the first in-vehicle terminal.

The first sending unit 11 automatically sends a broadcast message or a broadcast frame periodically, and in a particular distance, another in-vehicle terminal may receive the broadcast message or the broadcast frame. An in-vehicle terminal A may use multiple manners for sending the broadcast message, for example, broadcast the broadcast message in a local network or a cellular network. The broadcast message or the broadcast frame may further carry an identifier of the in-vehicle terminal A. The in-vehicle terminal A has a unique in-vehicle terminal identifier, which is pre-configured by an in-vehicle terminal vendor.

The first establishment unit 12 is configured to establish a first relationship with at least one second in-vehicle terminal that receives the broadcast message.

The in-vehicle terminal A sends the broadcast message, any other in-vehicle terminal that receives the broadcast message may communicate with the in-vehicle terminal A, and the first establishment unit 12 may establish a relationship with another in-vehicle terminal through communication.

The relationship herein is established by being triggered by broadcast, and any in-vehicle terminal that receives the broadcast message may establish this relationship with the in-vehicle terminal A. Therefore, the relationship may be referred to as an encounter relationship.

The second establishment unit 13 is configured to establish a second relationship with at least one third in-vehicle terminal.

The second establishment unit 13 may further establish a second relationship with any in-vehicle terminal. The any in-vehicle terminal may be specified by an in-vehicle user or selected from the second in-vehicle terminal according to a specified rule. For example, after establishing first relationships with multiple second in-vehicle terminals, the in-vehicle terminal A may further select some in-vehicle terminals, that is, third in-vehicle terminals, from the multiple second in-vehicle terminals according to a particular rule, and establish second relationships with the third in-vehicle terminals in a point-to-point manner and the like. The second relationship may be a friend relationship.

The exchange unit 14 is configured to separately exchange information about a correspondence type with the at least one second in-vehicle terminal and the at least one third in-vehicle terminal.

The in-vehicle terminal A establishes different relationships with the second in-vehicle terminal and the third in-vehicle terminal separately, and information of different types may be exchanged therebetween separately.

First, the in-vehicle terminal A collects information about vehicle driving and a status by using a CAN bus, where the information includes: tire pressure, a brake operating status, an engine operating status, a driving speed, a vehicle type, a fuel consumption status, and the like. The in-vehicle terminal A collects user status information by using a sensor or by connecting to BLUETOOTH of a wearable device, where the information includes: a fatigue degree of a user, alcohol content of a driver, an emotional status of the driver, and the like. The in-vehicle terminal A collects driving action information of a vehicle by using an in-vehicle sensor, where the information includes: a left turn, a right turn, braking, turning around, backing, merging, and the like of a vehicle. The in-vehicle terminal A collects some privacy information of the user by accessing another application, where the information includes: a driving route, a driving destination, and the like. An in-vehicle terminal B may also collect driving data of the in-vehicle terminal B in these manners. These information may be referred to as in-vehicle information.

Then, the in-vehicle terminal A categorizes the collected information, for example, the information may be categorized into absolute privacy information and absolute non-privacy information according to a rule preset by the user, and an overlapped part of the information may be categorized into privacy information or non-privacy information. As shown in the schematic diagram of categorizing automobile running data and driver status information in FIG. 2, some information that involves user privacy, such as the engine operating status and the user status information, is categorized as absolute privacy information; information that does not involve user privacy, such as the tire pressure, the brake operating status, and the driving action information, is categorized as absolute non-privacy information; and information that is neither private nor non-private, such as the fuel consumption status, the geographical location of the vehicle, the driving destination, and the driving route, may be categorized as privacy information or may be categorized as non-privacy information according to the preset rule.

The in-vehicle terminal A may determine, according to the relationship established with the second or third in-vehicle terminal, a type of in-vehicle information shared or exchanged with the second or third in-vehicle terminal. For example, the in-vehicle terminal A exchanges only absolute non-privacy information with a second in-vehicle terminal with which a first relationship is established, and may exchange absolute non-privacy information and absolute privacy information with a second in-vehicle terminal with which a second relationship is established. The in-vehicle terminal A sends in-vehicle information of the in-vehicle terminal A to the second or third in-vehicle terminal, and also receives in-vehicle information of the in-vehicle terminal from the second or third in-vehicle terminal. In this way, the in-vehicle terminal A establishes different relationships with different in-vehicle terminals in different communication manners, exchanges information of different types for the established different relationships, so that not only in-vehicle information can be exchanged with more in-vehicle terminals, and driving safety and comfort are improved by using the obtained in-vehicle information, but also information of different types is exchanged automatically with different in-vehicle terminals. This can properly protect privacy information of the user.

As can be seen, by means of the in-vehicle terminal provided in this embodiment of the disclosure, the in-vehicle terminal triggers, by sending a broadcast message, at least one surrounding second in-vehicle terminal to establish a first relationship with the in-vehicle terminal, and establishes a second relationship with at least one third in-vehicle terminal, and the in-vehicle terminal separately exchanges information about a corresponding type with the at least one second or third in-vehicle terminal. Therefore, a range of information exchange between in-vehicle terminals can be extended, so that more vehicles can intelligently exchange in-vehicle information, and exchange different information with different in-vehicle terminals. This can properly protect privacy information.

Figure 5:
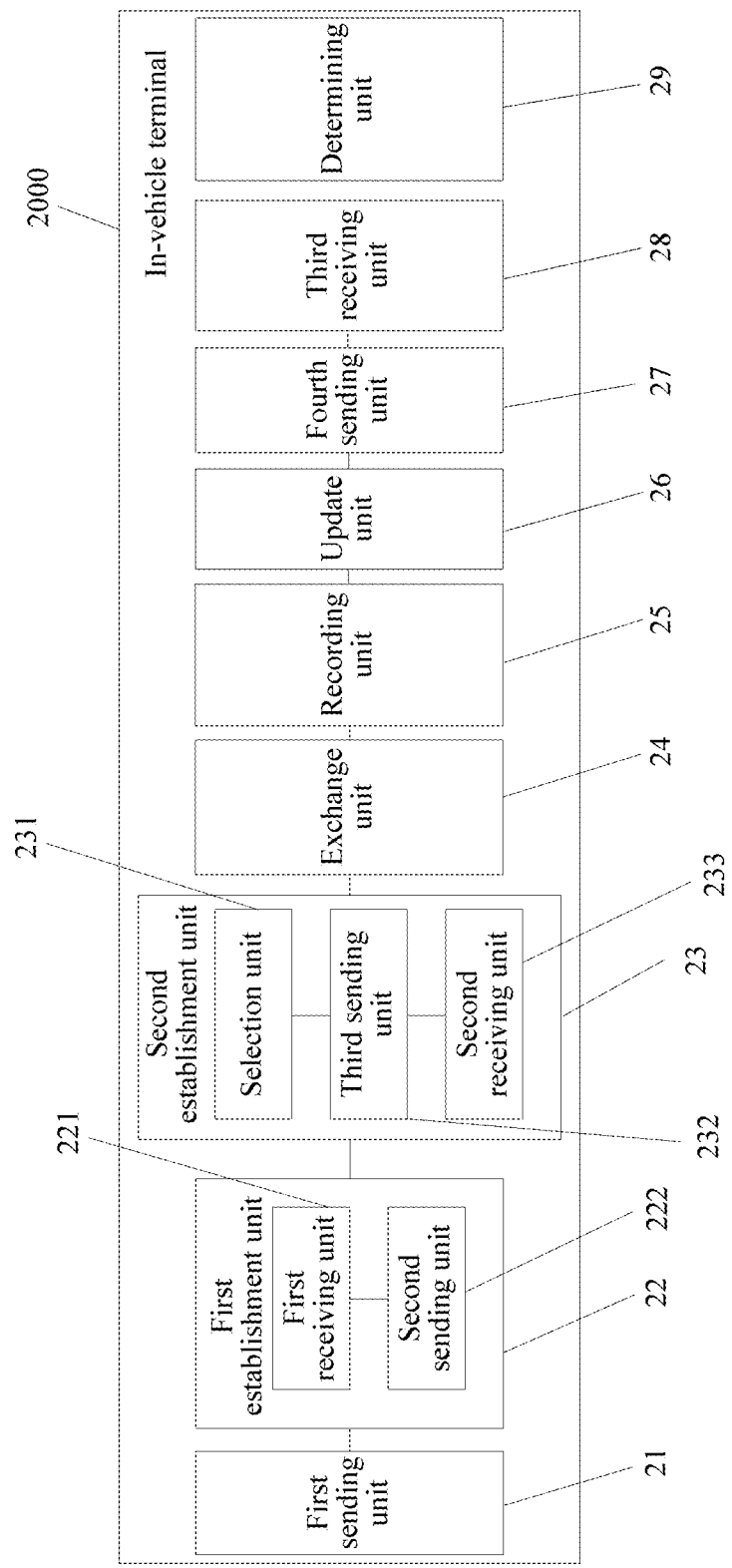
FIG. 5 is a schematic structural diagram of another in-vehicle terminal according to an embodiment of the disclosure.

Referring to FIG. 5, FIG. 5 is a schematic structural diagram of another in-vehicle terminal according to an embodiment of the disclosure. The in-vehicle terminal 2000 includes: a first sending unit 21, a first establishment unit 22, a second establishment unit 23, an exchange unit 24, a recording unit 25, an update unit 26, a fourth sending unit 27, a third receiving unit 28, and a determining unit 29.

The first sending unit 21 is configured to send a broadcast message, where the broadcast message carries an identifier of a first in-vehicle terminal.

The first sending unit 21 automatically sends a broadcast message or a broadcast frame periodically, and in a particular distance, another in-vehicle terminal may receive the broadcast message or the broadcast frame. The broadcast message or the broadcast frame may carry an identifier of an in-vehicle terminal A. The in-vehicle terminal A has a unique in-vehicle terminal identifier, which is pre-configured by an in-vehicle terminal vendor.

The in-vehicle terminal A may send the broadcast message to another in-vehicle terminal by means of a connection to a local network, and a specific manner is as follows: the in-vehicle terminal A configures a local WI-FI hotspot, and automatically configures an SSID and a password, generates a broadcast message, and places the broadcast message into a WI-FI broadcast (Beacon) frame, where a method is to add a Vendor specific element to the tail of the Beacon frame. A specific element structure is shown in Table 1.

The element ID specifies an element ID used by an additional Vendor specific element to trigger a subsequent encounter relationship establishment process by assisting in broadcasting an in-vehicle terminal identifier. The organization identifier represents an organization that defines broadcast frame information used to establish a social relationship. Behind the organization identifier is the in-vehicle terminal identifier. A vehicle type may be added behind the in-vehicle terminal identifier. The broadcast information is sent periodically together with the Beacon frame. Another in-vehicle terminal, for example, an in-vehicle terminal B, receives the Beacon frame, and parses out a broadcast message.

A social broadcast frame may also be formed independently, and is broadcast in a WiFi environment periodically at a particular time interval. A structure of the broadcast frame is shown in Table 2.

The Order represents an order of information (Information) in a broadcast frame. Vendor specific element information is shown in Table 3.

The element ID specifies an element ID used by an additional Vendor specific element to trigger a subsequent encounter relationship establishment process by assisting in broadcasting an in-vehicle terminal identifier. The organization identifier represents an organization that defines broadcast frame information used to establish a social relationship. Behind the organization identifier is the in-vehicle terminal identifier. The in-vehicle terminal A may also establish a relationship by means of a connection to a cellular network, and the in-vehicle terminal A exchanges information with another in-vehicle terminal by using a base station. Optionally, the broadcast message may further carry a nickname of the in-vehicle terminal A. By enabling another in-vehicle terminal to obtain the nickname of the in-vehicle terminal A, information exchange between the in-vehicle terminals may be more friendly and more interesting. The nickname may be configured by an in-vehicle terminal vendor, and subsequently a user may change the nickname of the in-vehicle terminal. For example, the nickname may be set by using a user interface of an in-vehicle intelligent terminal, or may be set by an intelligent terminal of the user. The intelligent terminal of the user connects to the vehicle intelligent terminal by means of BLUETOOTH, ZIGBEE, or WI-FI, or in an NFC form, finds an "in-vehicle terminal nickname setting" option, sets a nickname of the in-vehicle terminal after selecting the option, and sends the nickname of the in-vehicle terminal to the vehicle intelligent terminal by means of the foregoing wireless technology, and after receiving a nickname update message, the vehicle intelligent terminal updates the nickname of the in-vehicle terminal.

Optionally, the broadcast message may further carry an in-vehicle type of another in-vehicle terminal that requests to exchange in-vehicle information. By specifying an in-vehicle type, in a scenario in which there is an excessively large quantity of in-vehicle terminals, some in-vehicle terminals may be filtered out. For example, in a scenario in which some vehicles have complex statuses, attention may be paid only to dangerous vehicles, that is, the first relationship is established only with an in-vehicle terminal whose in-vehicle type is consistent with the in-vehicle type. Certainly, in a filtering policy, limiting a WI-FI transmit power of the in-vehicle terminal and disabling an in-vehicle information exchange function of the in-vehicle terminal may also be selected.

The first establishment unit 22 is configured to establish a first relationship with at least one second in-vehicle terminal that receives the broadcast message.

In this embodiment, the first establishment unit 22 includes a first receiving unit 221 and a second sending unit 222.

The first receiving unit 221 is configured to receive a first relationship establishment request message sent by the at least one second in-vehicle terminal, where the first relationship establishment request message carries the identifier of the first in-vehicle terminal and an identifier of the at least one second in-vehicle terminal.

The in-vehicle terminal A triggers, by sending a broadcast message, another in-vehicle terminal that receives the broadcast message, for example, an in-vehicle terminal B. If the in-vehicle terminal B intends to establish a relationship with the in-vehicle terminal A, the in-vehicle terminal B sends a relationship establishment request message to the in-vehicle terminal A, that is, the in-vehicle terminal B parses the broadcast message, acquires an identifier of the in-vehicle terminal A, and sends the request message to the in-vehicle terminal A corresponding to the identifier. Moreover, the request message carries the identifier of the in-vehicle terminal A and an identifier of the in-vehicle terminal B, and the in-vehicle terminals A and B have a unique identifier respectively.

The second sending unit 222 is configured to send a first relationship establishment confirmation message to the at least one second in-vehicle terminal according to the identifier of the at least one second in-vehicle terminal, to establish the first relationship, where the first relationship establishment confirmation message carries the identifier of the first in-vehicle terminal and the identifier of the at least one second in-vehicle terminal.

After the in-vehicle terminal A receives the relationship establishment request message sent by the in-vehicle terminal B, if the in-vehicle terminal A agrees to establish a relationship with the in-vehicle terminal B, the in-vehicle terminal A sends a relationship establishment confirmation message to the in-vehicle terminal B corresponding to the identifier of the in-vehicle terminal B, to establish the relationship.

The relationship herein is established by being triggered by broadcast, and any in-vehicle terminal that receives the broadcast message may establish this relationship with the in-vehicle terminal A. Therefore, the relationship may be referred to as an encounter relationship.

The first relationship establishment request message and the first relationship establishment confirmation message may be sent in a broadcast, unicast, or multicast form.

The second establishment unit 23 is configured to establish a second relationship with at least one third in-vehicle terminal.

The second establishment unit 23 is specifically configured to establish the second relationship with the at least one third in-vehicle terminal selected from the at least one second in-vehicle terminal.

In this embodiment, the second establishment unit 23 includes a selection unit 231, a third sending unit 232, and a second receiving unit 233.

The selection unit 231 is configured to select, according to a specified rule or a selection indication entered by a user, the at least one third in-vehicle terminal for establishing the second relationship from the at least one second in-vehicle terminal.

After establishing encounter relationships with some in-vehicle terminals, the in-vehicle terminal A may select, according to a particular rule and data in a relational database, some in-vehicle terminals from these in-vehicle terminals to establish second relationships, or may establish, according to a selection indication entered by the user, a second relationship with an indicated in-vehicle terminal, where the second relationship may be a friend relationship.

The specified rule includes at least one of the following: according to destination information included in the first in-vehicle information, a quantity of times that the first in-vehicle terminal establishing the first relationship and the second in-vehicle terminal share a same destination is greater than a first specified threshold; or a quantity of times that the first in-vehicle terminal establishes the first relationship with the second in-vehicle terminal is greater than a second specified threshold, where the first relationship may be an encounter relationship; or a quantity of times that the first in-vehicle terminal establishes the second relationship with the third in-vehicle terminal is greater than a third specified threshold, where the second relationship herein may be a friend relationship, and the third specified threshold may be 0.

The specified rule is mainly to filter, according to histories of the in-vehicle terminal A and another in-vehicle terminal, an in-vehicle terminal for establishing a friend relationship with the in-vehicle terminal A. The specified rule may be set or updated by the user, or may be generated by the in-vehicle terminal by means of self-study. A specific implementation manner of the specified rule is not limited herein.

The third sending unit 232 is configured to send a second relationship establishment request message to the at least one third in-vehicle terminal, so that the at least one third in-vehicle terminal determines, according to the specified rule, whether to agree to establish the second relationship.

The second receiving unit 233 is configured to receive a second relationship establishment confirmation message sent by the at least one third in-vehicle terminal, to establish the second relationship.

Similar to establishment of an encounter relationship, the in-vehicle terminal A establishes a friend relationship with the in-vehicle terminal B by requesting establishment and confirming establishment. In-vehicle information exchanged between the in-vehicle terminals between which a friend relationship is established may be non-privacy information and privacy information.

The exchange unit 24 is configured to separately exchange information about a correspondence type with the at least one second in-vehicle terminal and the at least one third in-vehicle terminal.

The exchange unit 24 is specifically configured to exchange first type information and second type information with the at least one second in-vehicle terminal and the at least one third in-vehicle terminal respectively, where the first type information includes non-privacy information, and the first relationship is an encounter relationship; and the second type information includes privacy information and non-privacy information, and the second relationship is a friend relationship.

The in-vehicle terminal A may determine, according to the relationship established with the second or third in-vehicle terminal, a type of in-vehicle information shared or exchanged with the second or third in-vehicle terminal. For example, the in-vehicle terminal A exchanges only absolute non-privacy information with a second in-vehicle terminal with which a first relationship is established, and may exchange absolute non-privacy information and absolute privacy information with a second in-vehicle terminal with which a second relationship is established. The in-vehicle terminal A sends the in-vehicle information of the in-vehicle terminal A to the second or third in-vehicle terminal, and also receives the in-vehicle information of the in-vehicle terminal from the second or third in-vehicle terminal.

For example, the first in-vehicle terminal carries a Beacon frame of an in-vehicle terminal identifier or a social broadcast frame generated by the first in-vehicle terminal, and broadcasts the Beacon frame and the social broadcast frame in a CCH. The second in-vehicle terminal listens on the control channel, and seeks for a relatively idle SCH in a listening manner. The second in-vehicle terminal maintains an SCH entry table in which a status of each shared channel is recorded, and when a shared channel is idle is recorded. After the Beacon frame that carries the in-vehicle terminal identifier or the social broadcast frame generated by the first in-vehicle terminal are received, a RTS frame is sent on the CCH. The frame carries information about a selected idle SCH. After determining that the SCH is available, the first in-vehicle terminal sends a CTS frame on the CCH for confirmation. Then, the two terminals are transferred to the selected SCH to exchange data.

The data exchange may be: 1) The second in-vehicle terminal sends a first relationship establishment request message on a selected SCH, and the first in-vehicle terminal sends an establishment confirmation message after receiving the request; 2) the second in-vehicle terminal sends the establishment confirmation message on the selected SCH; 3) the second in-vehicle terminal and the first in-vehicle terminal perform broadcasting to each other on the selected SCH; and 4) the first in-vehicle terminal exchanges first information with the second in-vehicle terminal on the selected SCH in a broadcast manner.

The recording unit 25 is configured to: record, in a relational database according to the identifier of the at least one second in-vehicle terminal and/or an identifier of the at least one third in-vehicle terminal, a quantity of times of establishing the first relationship with the at least one second in-vehicle terminal in a valid time period, record a quantity of times of establishing the second relationship with the at least one third in-vehicle terminal in the valid time period, and record the information exchanged with the at least one second in-vehicle terminal or third in-vehicle terminal.

According to an identifier of each in-vehicle terminal that has established an encounter relationship or a friend relationship with the first in-vehicle terminal, a quantity of times of establishing encounter relationships or friend relationships with the first in-vehicle terminal and information exchanged therebetween are separately recorded in a relational database, and after an encounter relationship or a friend relationship is established with an in-vehicle terminal corresponding to each identifier once, the quantity of times of establishment of encounter relationships or friend relationships is added by 1. A format of data entered into the database may include: an entering reason, for example, an encounter relationship is established successfully or a friend relationship is established successfully or a same destination is shared, an identifier of a target in-vehicle terminal, and an entering time.

It should be noted that, because a friend relationship or an encounter relationship recorded in an excessively long time may be meaningless, only an encounter relationship or a friend relationship established in a valid time period is saved. The first in-vehicle terminal may set a time for each piece of newly entered data, and when a valid time expires, delete the friend or encounter relationship record recorded in the data. For example, if a quantity of times of establishment of currently recorded encounter relationships is 4, and when a piece of data expires, the quantity of times of establishment of the recorded encounter relationships becomes 3.

The update unit 26 is configured to update a relationship with the at least one third in-vehicle terminal that does not meet the specified rule in a valid time or that is indicated by a relationship change indication entered by the user, to the first relationship.

The in-vehicle terminal A may also change the relationship established with another in-vehicle terminal. Upgrading an encounter relationship to a friend relationship has been described in the foregoing steps. Some third in-vehicle terminals may be selected from the second in-vehicle terminals according to a specified rule or a user indication, and a first relationship is upgraded to a second relationship. However, in a case in which the in-vehicle terminal A and the another vehicle already have a friend relationship, the in-vehicle terminal A may also change a friend relationship to an encounter relationship, that is, after a second relationship is established with the third in-vehicle terminal, if a specified rule is always not met in a valid time, or a user instructs to change the friend relationship, the second relationship may be updated to the first relationship.

The fourth sending unit 27 is configured to separately send a positioning information request to the at least one second in-vehicle terminal or the at least one third in-vehicle terminal that has established the first relationship and/or the second relationship with the first in-vehicle terminal.

The third receiving unit 28 is configured to receive positioning information sent by the at least one second in-vehicle terminal and/or the at least one third in-vehicle terminal.

The determining unit 29 is configured to determine a current location of the first in-vehicle terminal according to the positioning information sent by the at least one second in-vehicle and/or the at least one third in-vehicle terminal.

In some scenarios, the in-vehicle terminal A has no positioning function or positioning precision is insufficient, and the in-vehicle terminal A may acquire positioning information of the in-vehicle terminal A from an in-vehicle terminal that has established an encounter relationship and/ or a friend relationship with the in-vehicle terminal A, thereby determining a current location of the in-vehicle terminal A. When the location information obtained from the in-vehicle terminal that has established the first or second relationship cannot provide a positioning service that meets a precision requirement, positioning precision is optimized by acquiring location information of an in-vehicle terminal that has established another relationship.

For example, generally, when an in-vehicle terminal is positioned, most in-vehicle terminals located around the in-vehicle terminal are in-vehicle terminals that have established an encounter relationship. Therefore, positioning information may be first acquired from these in-vehicle terminals that have established the encounter relationship. Certainly, first, positioning information of these in-vehicle terminals that have established the encounter relationship needs to be set to non-privacy information, that is, these in-vehicle terminals may share positioning information with an in-vehicle terminal that requests to acquire the positioning information. If not all in-vehicle terminals that have established the encounter relationship set positioning information to non-privacy information, the positioning information acquired by the in-vehicle terminal may be positioning information of some in-vehicle terminals that have established the encounter relationship with the in-vehicle terminal.

The user may consider that positioning information provided by a friend is more believable. Therefore, positioning information may also be first acquired from an in-vehicle terminal that has established a friend relationship. To optimize positioning precision, then positioning information is further acquired from an in-vehicle terminal that has established an encounter relationship with the in-vehicle terminal.

Most in-vehicle terminals that have established the encounter relationship may set positioning information to privacy information. To optimize positioning precision, positioning information needs to be further acquired from the in-vehicle terminal that has established a friend relationship with the in-vehicle terminal. In-vehicle terminals that have established a friend relationship may generally share positioning information.

As can be seen, by means of the in-vehicle terminal provided in this embodiment of the disclosure, a first in-vehicle terminal triggers, by broadcasting a broadcast message, at least one surrounding second in-vehicle terminal to establish a first relationship with the first in-vehicle terminal, and selects at least one third in-vehicle terminal from the at least one second in-vehicle terminal to establish a second relationship with the first in-vehicle terminal, and the first in-vehicle terminal separately exchanges information about a correspondence type with the at least one second or third in-vehicle terminal. Therefore, a range of information exchange between in-vehicle terminal can be extended, so that more vehicles can intelligently exchange in-vehicle information, and exchange different information with different in-vehicle terminals. This can properly protect privacy information. In addition, an in-vehicle terminal may be positioned by using positioning information in different relationships.

Figure 6:
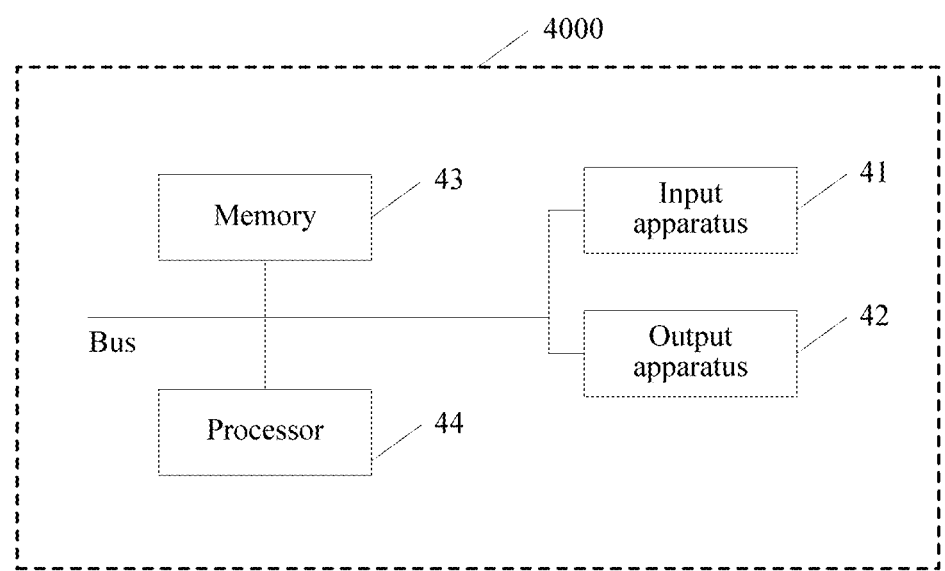
FIG. 6 is a schematic structural diagram of still another in-vehicle terminal according to an embodiment of the disclosure.

Referring to FIG. 6, FIG. 6 is a schematic structural diagram of still another in-vehicle terminal according to an embodiment of the disclosure. The in-vehicle terminal 4000 includes an input apparatus 41, an output apparatus 42, a memory 43, and a processor 44 (there may be one or more processors 44 in the in-vehicle terminal, and in FIG. 5, an example of one processor is used). In some embodiments of the disclosure, the input apparatus 41, the output apparatus 42, the memory 43, and the processor 44 may be connected by using a bus or in another manner. In FIG. 5, an example in which connection is implemented by using a bus is used.

The processor 44 is configured to perform the following steps: sending a broadcast message, where the broadcast message carries an identifier of the first in-vehicle terminal; establishing a first relationship with at least one second in-vehicle terminal that receives the broadcast message; establishing a second relationship with at least one third in-vehicle terminal; and separately exchanging information about a correspondence type with the at least one second in-vehicle terminal and the at least one third in-vehicle terminal.

In an implementation manner, the step, which is performed by the processor 44, of establishing a first relationship with at least one second in-vehicle terminal that receives the broadcast message includes receiving a first relationship establishment request message sent by the at least one second in-vehicle terminal, where the first relationship establishment request message carries the identifier of the first in-vehicle terminal and an identifier of the at least one second in-vehicle terminal; and sending a first relationship establishment confirmation message to the at least one second in-vehicle terminal according to the identifier of the at least one second in-vehicle terminal, to establish the first relationship, where the first relationship establishment confirmation message carries the identifier of the first in-vehicle terminal and the identifier of the at least one second in-vehicle terminal.

In another implementation manner, the step, which is performed by the processor 44, of establishing a second relationship with at least one third in-vehicle terminal includes establishing the second relationship with the at least one third in-vehicle terminal selected from the at least one second in-vehicle terminal.

In still another implementation manner, the step, which is performed by the processor 44, of establishing the second relationship with the at least one third in-vehicle terminal selected from the at least one second in-vehicle terminal includes selecting, according to a specified rule or a selection indication entered by a user, the at least one third in-vehicle terminal for establishing the second relationship from the at least one second in-vehicle terminal; sending a second relationship establishment request message to the at least one third in-vehicle terminal, so that the at least one third in-vehicle terminal determines, according to the specified rule, whether to agree to establish the second relationship; and receiving a second relationship establishment confirmation message sent by the at least one third in-vehicle terminal, to establish the second relationship.

In yet another implementation manner, the processor 44 further performs the following steps: recording, in a relational database according to the identifier of the at least one second in-vehicle terminal and/or an identifier of the at least one third in-vehicle terminal, a quantity of times of establishing the first relationship with the at least one second in-vehicle terminal in a valid time period, recording a quantity of times of establishing the second relationship with the at least one third in-vehicle terminal in the valid time period, and recording the information exchanged with the at least one second in-vehicle terminal or third in-vehicle terminal.

In yet another implementation manner, the specified rule includes at least one of the following: according to destination information included in the information, a quantity of times that the first in-vehicle terminal and the at least one second in-vehicle terminal share a same destination is greater than a first specified threshold; or a quantity of times that the first in-vehicle terminal establishes the first relationship with the at least one second in-vehicle terminal is greater than a second specified threshold; or a quantity of times that the first in-vehicle terminal establishes the second relationship with the at least one third in-vehicle terminal is greater than a third specified threshold.

In yet another implementation manner, the processor 44 further performs updating a relationship with the at least one third in-vehicle terminal that does not meet the specified rule in a valid time or that is indicated by a relationship change indication entered by the user, to the first relationship.

In yet another implementation manner, the step, which is performed by the processor 44, of exchanging information about a correspondence type with the at least one second in-vehicle terminal and/or the at least one third in-vehicle terminal separately is exchanging first type information and second type information with the at least one second in-vehicle terminal and the at least one third in-vehicle terminal respectively, where the first type information includes non-privacy information, and the first relationship is an encounter relationship; and the second type information includes privacy information and non-privacy information, and the second relationship is a friend relationship.

In yet another implementation manner, the broadcast message further carries a vehicle type of an in-vehicle terminal that exchanges information with the first in-vehicle terminal, and a vehicle type of the at least one second in-vehicle terminal is consistent with the vehicle type carried in the broadcast message.

In yet another implementation manner, the processor 44 further performs the following steps: separately sending a positioning information request to the at least one second in-vehicle terminal or the at least one third in-vehicle terminal that has established the first relationship and/or the second relationship with the first in-vehicle terminal; receiving positioning information sent by the at least one second in-vehicle terminal and/or the at least one third in-vehicle terminal; and determining a current location of the first in-vehicle terminal according to the positioning information sent by the at least one second in-vehicle and/or the at least one third in-vehicle terminal.

It may be understood that, functions of functional modules of the in-vehicle terminal 4000 in this embodiment may be specifically implemented according to the methods in the foregoing method embodiments. For a specific implementation process, refer to the related descriptions in the foregoing method embodiments, and details are not described herein again.

As can be seen, by means of the in-vehicle terminal provided in this embodiment of the disclosure, the in-vehicle terminal triggers, by broadcasting a broadcast message, at least one surrounding second in-vehicle terminal to establish a first relationship with the in-vehicle terminal, and selects at least one third in-vehicle terminal from the at least one second in-vehicle terminal to establish a second relationship with the in-vehicle terminal, and the in-vehicle terminal separately exchanges information about a corresponding type with the at least one second or third in-vehicle terminal. Therefore, a range of information exchange between in-vehicle terminals can be extended, so that more vehicles can intelligently exchange in-vehicle information, and exchange different information with different in-vehicle terminals. This can properly protect privacy information.

It should be noted that, for brief description, the foregoing method embodiments are represented as a series of actions. However, a person skilled in the art should appreciate that the disclosure is not limited to the described order of the actions, because according to the disclosure, some steps may be performed in other orders or simultaneously. In addition, a person skilled in the art should also appreciate that all the embodiments described in the specification are exemplary embodiments, and the related actions and modules are not necessarily mandatory to the disclosure.

In the foregoing embodiments, the description of each embodiment has respective focuses. For a part that is not described in detail in an embodiment, reference may be made to related descriptions in other embodiments.

A sequence of the steps of the method in the embodiments of the disclosure may be adjusted, and certain steps may also be merged or removed according to an actual need.

Merging, division, and removing may be performed on the units in the embodiments of the disclosure according to an actual need. A person skilled in the art may combine different embodiments and features of different embodiments described in this specification.

With descriptions of the foregoing embodiments, a person skilled in the art may clearly understand that the disclosure may be implemented by hardware, firmware or a combination thereof. When the disclosure is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following is taken as an example but is not limited: The computer readable medium may include a random access memory (RAM), a read-only memory (ROM), an electrically erasable programmable read-only memory (EEPROM), a compact disc read-only memory (CD-ROM) or other optical disk storage, a disk storage medium or other disk storage, or any other medium that can be used to carry or store expected program code in a command or data structure form and can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk and disc used by the disclosure includes a compact disc (CD), a laser disc, an optical disc, a digital versatile disc (DVD), a floppy disk and a Blu-ray® disc, where the disk generally copies data by a magnetic means, and the disc copies data optically by a laser means. The foregoing combination should also be included in the protection scope of the computer-readable medium.

In summary, what is described above is merely exemplary embodiments of the technical solutions of the disclosure, but is not intended to limit the protection scope of the disclosure. Any modification, equivalent replacement, or improvement made without departing from the spirit and principle of the disclosure shall fall within the protection scope of the disclosure.

What is claimed is:

1. A method for exchanging information between in-vehicle terminals, comprising:
    automatically sending, by a first in-vehicle terminal, a broadcast message, wherein the broadcast message comprises an identifier of the first in-vehicle terminal;
    establishing, by the first in-vehicle terminal, a first relationship with at least one second in-vehicle terminal that receives the broadcast message;
    selecting, by the first in-vehicle terminal, a third in-vehicle terminal from the at least one second in-vehicle terminal to establish a second relationship based on a rule generated by the first in-vehicle terminal;
    establishing, by the first in-vehicle terminal, the second relationship with the third in-vehicle terminal from the at least one second in-vehicle terminal in response to selecting the third in-vehicle terminal from the at least one second in-vehicle terminal based on the rule generated by the first in-vehicle terminal;
    separately exchanging, by the first in-vehicle terminal, first information corresponding to the at least one second in-vehicle terminal and second information corresponding to the third in-vehicle terminal with each of the at least one second in-vehicle terminal and the third in-vehicle terminal, respectively, wherein the first information comprises non-privacy information, and wherein the second information comprises privacy information and non-privacy information;
    recording, by the first in-vehicle terminal in a relational database according to at least one of the identifier of the at least one second in-vehicle terminal and an identifier of the third in-vehicle terminal, a quantity of times of establishing the first relationship with the at least one second in-vehicle terminal in a valid time period;
    recording a quantity of times of establishing the second relationship with the third in-vehicle terminal in the valid time period; and
    recording the information exchanged with the at least one second in-vehicle terminal or the third in-vehicle terminal.

2. The method according to claim 1, wherein establishing, by the first in-vehicle terminal, the first relationship with at least one second in-vehicle terminal that receives the broadcast message comprises:
    receiving, by the first in-vehicle terminal, a first relationship establishment request message sent by the at least one second in-vehicle terminal, wherein the first relationship establishment request message comprises the identifier of the first in-vehicle terminal and an identifier of the at least one second in-vehicle terminal; and
    sending, by the first in-vehicle terminal, a first relationship establishment confirmation message to the at least one second in-vehicle terminal according to the identifier of the at least one second in-vehicle terminal, to establish the first relationship, wherein the first relationship establishment confirmation message comprises the identifier of the first in-vehicle terminal and the identifier of the at least one second in-vehicle terminal.

3. The method according to claim 2, wherein establishing, by the first in-vehicle terminal, the second relationship with the third in-vehicle terminal selected from the at least one second in-vehicle terminal comprises:
    sending, by the first in-vehicle terminal, a second relationship establishment request message to the third in-vehicle terminal, so that the third in-vehicle terminal determines, according to the generated rule, whether to agree to establish the second relationship; and
    receiving, by the first in-vehicle terminal, a second relationship establishment confirmation message sent by the third in-vehicle terminal, to establish the second relationship.

4. The method according to claim 1, wherein the generated rule comprises at least one of the following:
    a quantity of times that the first in-vehicle terminal and the at least one second in-vehicle terminal share a same destination that is greater than a first specified threshold according to destination information comprised in the information;
    a quantity of times that the first in-vehicle terminal establishes the first relationship with the at least one second in-vehicle terminal that is greater than a second specified threshold; or
    a quantity of times that the first in-vehicle terminal establishes the second relationship with the third in-vehicle terminal that is greater than a third specified threshold.

5. The method according to claim 4, further comprising updating, by the first in-vehicle terminal, a relationship with the third in-vehicle terminal that does not meet the generated rule in a valid time period or that is indicated by a relationship change indication received by user input to the first relationship.

6. The method according to claim 1, wherein the first relationship is an encounter relationship, and wherein the second relationship is a friend relationship.

7. The method according to claim 1, wherein the broadcast message further comprises a vehicle type of an in-vehicle terminal that exchanges information with the first in-vehicle terminal, and a vehicle type of the at least one second in-vehicle terminal is consistent with the vehicle type carried in the broadcast message.

8. The method according to claim 1, further comprising:
separately sending, by the first in-vehicle terminal, positioning information request to the at least one second in-vehicle terminal or the third in-vehicle terminal that has established the first relationship and/or the second relationship with the first in-vehicle terminal;
receiving, by the first in-vehicle terminal, at least one of positioning information sent by the at least one second in-vehicle terminal and the third in-vehicle terminal; and
determining, by the first in-vehicle terminal, a current location of the first in-vehicle terminal according to at least one of the positioning information sent by the at least one second in-vehicle terminal and the third in-vehicle terminal.

9. An in-vehicle terminal, comprising:
a memory comprising instructions; and
a processor coupled to the memory, wherein the instructions cause the processor to be configured to:
automatically send a broadcast message, wherein the broadcast message comprises an identifier of a first in-vehicle terminal;
establish a first relationship with at least one second in-vehicle terminal that receives the broadcast message;
select a third in-vehicle terminal from the at least one second in-vehicle terminal to establish a second relationship based on a rule generated by the first in-vehicle terminal;
establish the second relationship with the third in-vehicle terminal from the at least one second in-vehicle terminal in response to selecting the third in-vehicle terminal from the at least one second in-vehicle terminal based on the rule generated by the first in-vehicle terminal;
separately exchange first information corresponding to the at least one second in-vehicle terminal and second information corresponding to the third in-vehicle terminal with each of the at least one second in-vehicle terminal and the third in-vehicle terminal, respectively, wherein the first information comprises non-privacy information, and wherein the second information comprises privacy information and non-privacy information;
record, in a relational database according to at least one of the identifier of the at least one second in-vehicle terminal and an identifier of the third in-vehicle terminal, a quantity of times of establishing the first relationship with the at least one second in-vehicle terminal in a valid time period;
record a quantity of times of establishing the second relationship with the third in-vehicle terminal in the valid time period; and
record information exchanged with the at least one second in-vehicle terminal or the third in-vehicle terminal.

10. The in-vehicle terminal according to claim 9, wherein the instructions further cause the processor to be configured to:
receive a first relationship establishment request message sent by the at least one second in-vehicle terminal, wherein the first relationship establishment request message comprises the identifier of the first in-vehicle terminal and an identifier of the at least one second in-vehicle terminal; and
send a first relationship establishment confirmation message to the at least one second in-vehicle terminal according to the identifier of the at least one second in-vehicle terminal, to establish the first relationship, wherein the first relationship establishment confirmation message comprises the identifier of the first in-vehicle terminal and the identifier of the at least one second in-vehicle terminal.

11. The in-vehicle terminal according to claim 10, wherein the instructions further cause the processor to be configured to:
send a second relationship establishment request message to the third in-vehicle terminal, so that the third in-vehicle terminal determines, according to the generated rule, whether to agree to establish the second relationship; and
receive a second relationship establishment confirmation message sent by the third in-vehicle terminal to establish the second relationship.

12. The in-vehicle terminal according to claim 9, wherein the generated rule comprises at least one of the following:
a quantity of times that the first in-vehicle terminal and the at least one second in-vehicle terminal share a same destination is greater than a first specified threshold according to destination information comprised in the first or the second information;
a quantity of times that the first in-vehicle terminal establishes the first relationship with the at least one second in-vehicle terminal is greater than a second specified threshold; or
a quantity of times that the first in-vehicle terminal establishes the second relationship with the third in-vehicle terminal is greater than a third specified threshold.

13. The in-vehicle terminal according to claim 12, wherein the instructions further cause the processor to be configured to update a relationship with the third in-vehicle terminal that does not meet the generated rule in a valid time period or that is indicated by a relationship change indication entered by a user, to the first relationship.

14. The in-vehicle terminal according to claim 9, wherein the first relationship is an encounter relationship, and wherein the second relationship is a friend relationship.

15. The in-vehicle terminal according to claim 9, wherein the broadcast message further comprises a vehicle type of an in-vehicle terminal that exchanges information with the first in-vehicle terminal, and wherein a vehicle type of the at least one second in-vehicle terminal is consistent with the vehicle type carried in the broadcast message.

16. The in-vehicle terminal according to claim 9, wherein the instructions further cause the processor to be configured to:
separately send positioning information request to the at least one second in-vehicle terminal or the third in-vehicle terminal that has established at least one of the first relationship and the second relationship with the first in-vehicle terminal;

receive positioning information sent by at least one of the at least one second in-vehicle terminal and/or the third in-vehicle terminal; and determine a current location of the first in-vehicle terminal according to the positioning information sent by at least one of the at least one second in-vehicle terminal and the third in-vehicle terminal.

\* \* \* \* \*